United States Patent [19]

Matsumura

[11] Patent Number: 4,752,870

[45] Date of Patent: Jun. 21, 1988

[54] DECENTRALIZED INFORMATION PROCESSING SYSTEM AND INITIAL PROGRAM LOADING METHOD THEREFOR

[75] Inventor: Tomoyoshi Matsumura, Hino, Japan

[73] Assignee: Tokyo Shibaura Denki Kabushiki Kaisha, Kawasaki, Japan

[21] Appl. No.: 4,774

[22] Filed: Jan. 9, 1987

Related U.S. Application Data

[63] Continuation of Ser. No. 536,449, Sep. 28, 1983, abandoned.

[30] Foreign Application Priority Data

Sep. 29, 1982 [JP] Japan ................................ 57-170257
Nov. 30, 1982 [JP] Japan ................................ 57-209558

[51] Int. Cl.⁴ .............................................. G06F 13/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,786,433 | 1/1974 | Notley et al. | 364/200 |
| 4,117,974 | 10/1978 | Ciaramella | 371/51 |
| 4,145,739 | 3/1979 | Dunning et al. | 364/200 |
| 4,253,148 | 2/1981 | Johnson et al. | 364/200 |
| 4,335,426 | 6/1982 | Maxwell et al. | 364/200 |
| 4,441,162 | 4/1984 | Lille | 364/900 |
| 4,509,121 | 4/1985 | Rey et al. | 364/200 |

OTHER PUBLICATIONS

S. B. Wexler, "Initial Program Load from Remote Terminal", *IBM Technical Disclosure Bulletin*, vol. 13, No. 3 (Aug. 1970).
B. B. Young et al, "Remote Initial Program Load and Library Maintenance for Satellite Computers", *IBM Technical Disclosure Bulletin*, vol. 13, No. 5, (Oct. 1970).

*Primary Examiner*—David Y. Eng
*Attorney, Agent, or Firm*—Foley & Lardner, Schwartz, Jeffery, Schwaab, Mack, Blumenthal & Evans

[57] ABSTRACT

In a decentralized information processing system comprising a system controller and work station, initial program loading is done by transferring a program from one of the work stations to the system controller, or to another work station that has issued a request for initial program loading.

9 Claims, 3 Drawing Sheets

DECENTRALIZED INFORMATION PROCESSING SYSTEM AND INITIAL PROGRAM LOADING METHOD THEREFOR

This application is a, continuation, of application Ser. No. 536,449, filed Sept. 28, 1983 now abandoned.

BACKGROUND OF THE INVENTION

The present invention relates to a decentralized information processing system and a method of initial program loading for the system.

In a conventional decentralized or distributed information processing system having a system controller controlling flow of data within the system and at least one work station connected to the system controller, initial loading of a control program onto the system controller at the time of set-up of the system was accomplished by transferring the control program to the system controller from an input device or an external memory connected to the system controller. Initial program loading of a control program onto the work station was accomplished by transferring the control program to the work station via the system controller from the external memory connected to the system controller. As a result, the burden of the system controller was heavy and the utilization of the resources was not efficient.

SUMMARY OF THE INVENTION

An object of the invention is to reduce the burden of the system controller in a decentralized information processing system.

Another object of the invention is to improve the efficiency in the utilization of the resources in a decentralized information processing system.

Another object of the invention is to eliminate an input device which is not used other than in the initial program loading.

A further object of the invention is to enable initial program loading at a higher efficiency.

According to one aspect of the invention, there is provided a decentralized information processing system comprising a system controller for controlling flow of data within the system, and at least one work station connected to the system controller, wherein the system controller and the work station are adapted to establish a data link between them at the time of set-up of the system, the work station is adapted to transmit a program toward the system controller through the data link established, and the system controller is adapted to receive the program transmitted and have it loaded.

According to another aspect of the invention, there is provided a decentralized information processing system comprising a system controller for controlling flow of data within the system and a plurality of work stations connected to the system controller, wherein each of the work stations is adapted to issue a request for initial program loading at the time of set-up, the system controller is adapted to receive from any of the work stations a request for initial program loading, and to search for a work station having a program already loaded, each of the work stations is adapted to transmit, when it has a program already loaded, the program responsive to the search, and the work station having issued the request for initial program loading is adapted to receive the program transmitted and have it loaded.

According to a further aspect of the invention, there is provided an initial program loading method for a decentralized information processing system comprising a system controller for controlling flow of data within the system and at least one work station connected to the system controller, wherein, at the time of set-up of the system, a data link is established between the system controller and the work station, and a program is transferred through the data link established from the work station to the system controller to be loaded in the system controller.

According to a further aspect of the invention, there is provided an initial program loading method for a decentralized information processing system comprising a system controller for controlling flow of data within the system and a plurality of work stations connected to the system controller, wherein, at the time of set-up of one of the work stations, a request for initial program loading is issued from said one of the work stations, a search is made by the system controller, in response to the request for initial program loading, for a work station having initial program loading completed, and a program is transferred from the work station which has been found to have initial program loading completed to said one of the work stations which has issued the request for initial program loading.

DESCRIPTION OF THE PREFERRED EMBODIMENTS

Prior to describing, in detail, the embodiments of the invention, an example of conventional system is described with reference to FIG. 1 in order to have a better understanding of the problems which the present invention has solved.

Figure 1:
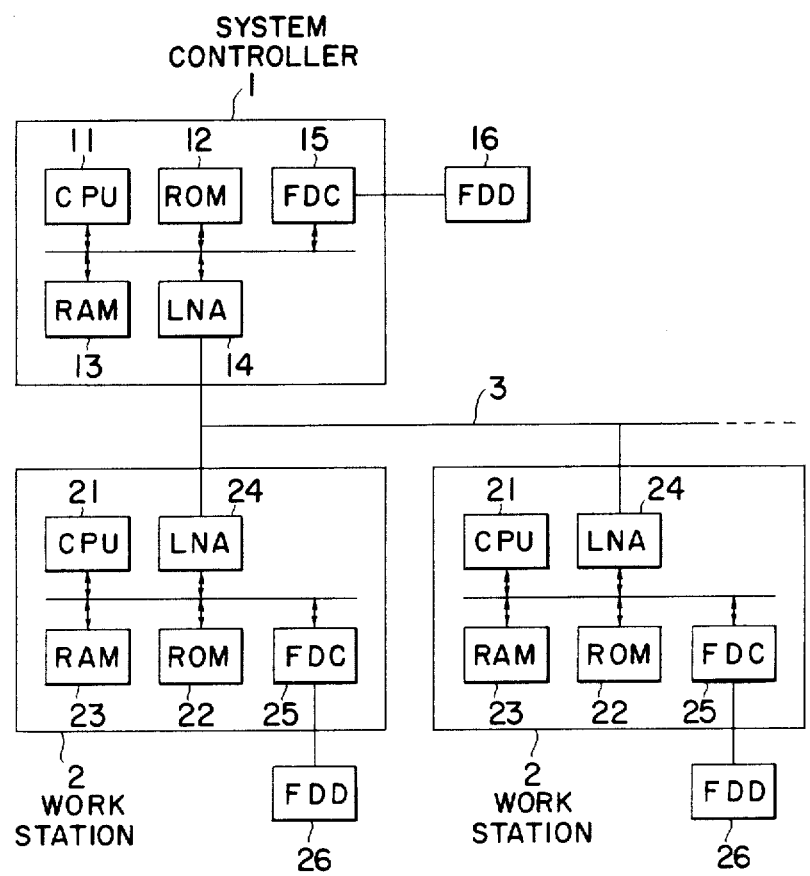
FIG. 1 is a block diagram showing an example of a conventional decentralized information processing system.

In general, a decentralized information processing system has, as shown in FIG. 1, a system controller 1 controlling flow of data within the system through a connecting cable 3, and a plurality of work stations 2 having a keyboard not shown and/or a display device to provide the operator with data processing functions. The system controller 1 comprises a central processing unit (hereinafter referred to as CPU) 11, a read only memory (hereinafter referred to as ROM) 12, a random access memory (hereinafter referred to as RAM) 13, a local network adapter (hereinafter referred to as LNA) 14, and a floppy disk controller (hereinafter referred to as FDC) 15 controlling a floppy disk drive (hereinafter referred to as FDD) 16 provided externally to the system controller 1. Each of the work stations 2 similarly comprises a CPU 21, a ROM 22, a RAM 23, a LNA 24 and a FDC 25 controlling a FDD 26.

With this arrangement, initial program loading at the time of set-up of the system is done in the following way. First, when the system controller 1 is powered, the CPU 11 starts its operation and executes the program (an initial program loader) in the ROM 12, i.e., it reads the program stored in the floppy disk on the FDD 16 connected to the FDC 15 and writes the program in the RAM 13. The CPU 11 then transfers the control to the program loaded in the RAM 13 and starts the execution of the task. The series of operations described above form an initial program loading.

Initial program loading on the work station 2 is done by starting the LNA 14, 24 under the control of the CPU 11, 21 of the system controller 1 and the work station 2, and writing the program read by the system controller 1 into the RAM 23 in the work station 2. More particularly, when a work station 2 is just powered, it sends, under the control of the initializing program stored in the ROM 22, a request for initial program loading to the system controller 1 through the connecting line 3. Responsive to the request, the system controller 1 reads the program stored in the RAM 13 or in a floppy disk on the FDD 16, and sends the program to the work station 2 through the connecting line 3. The work station 2 receives the program and stores it in the RAM 23 under the control of an initializing program. Only part of the program is read, transferred and stored at a time, and such actions are repeated until the entire program is loaded, when the control of the work station 2 is transferred from the initializing program to the program just loaded in the RAM 23, and the control program of the work station 2 starts. The initial program loading is thus completed.

After the completion of the initial program loading, the input device, i.e., the FDD 16 can be utilized as a hardware resource for execution of the task. Such utilization was in fact made in the past. But the trend in recent years is toward decentralization or distribution. More particularly, trend is from centralized processing where only the system controller 1 is provided with an input/output device and the work stations 2 refer to the input/output device under the management of the system program of the system controller 1, toward decentralized processing wherein all the work stations 2 are provided with an input/output device so that each work station 2 can refer not only to the input/output device connected thereto but also to the input/output devices connected to other work stations 2. The trend of decentralization is also taking place in the makeup of the system program: management programs which were centralized in the system controller 1 are now transferred to each work station 2 and each work station 2 has a certain degree of freedom in carrying out the data processing. This decentralization aims at improving the performance of each work station 2 and hence the entire system.

As a result, the input/output device of the system controller 1 (which in the centralized processing system was effectively utilized even after the initial program loading) is rarely utilized after the initial program loading in the decentralized processing system. In general, input/output devices are expensive and are not worthy of the cost if they are not fully utilized. In addition, input/output devices are generally bulky, so that space occupied by them can be too big for their usefulness.

Moreover, the initial program loading of the above described conventional method requires the system controller 1 to keep the program of the work stations 2 so that it has the following problems.

(1) Where the control program of the work station 2 is stored in the RAM 13 of the system controller, the particular area of the RAM 13 used for storing the control program of the work stations 2 cannot be used for the task of the system controller 1, so that the area can raise the overhead of the system controller 1. In other words, part of the RAM 13 is occupied for storing the control program of the work station 2, so that function of the system controller 1 in its execution of the task is lowered because of the reduced size of the memory area available for executing the task. To compensate for the shortage of the memory area, a memory of a large capacity memory is needed. This raises the cost of the system.

(2) Where the control program of the work stations 2 is stored in an external memory of a non-fixed type, such as a floppy disk 16, it is necessary either to save a FDD all the time to enable immediate response to a request for initial program loading, or to require human operator attention every time an initial program loading request is issued. Where an external memory of a fixed type such as a disk device is used for storing the control program of the work stations, the overhead is raised as is where the RAM 13 is used for the storage.

The invention therefore aims at solving the abovedescribed problems of the prior art; enabling initial program loading in a decentralized data processing system without resorting to the input device of the system controller thereby making it possible to eliminate the input device of the system controller; and providing a method of initial program loading which is efficient in terms of cost and space.

Figure 2:
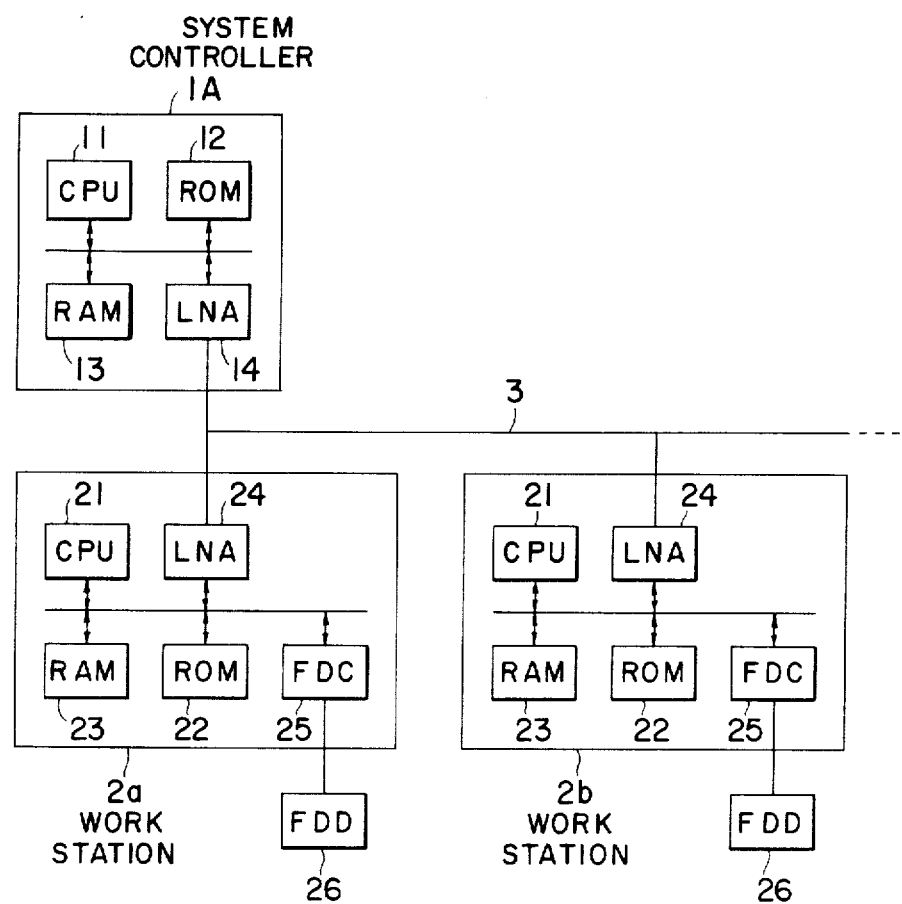
FIG. 2 is a block diagram showing an embodiment of the decentralized information processing system according to the invention.

FIG. 2 shows an embodiment of a decentralized information processing system according to the invention. The system controller 1A is similar to the system controller 1 in FIG. 1 and comprises a CPU 11, a ROM 12 administering the control until the initial program loading is completed, a RAM 13 serving as a main memory, and a LNA 14 serving as an interface with a connecting cable 3. The system controller 1A however differs from the system controller 1 in that it does not have a FDC 15. Work stations 2a, 2b . . . are similar to the work stations 2 in FIG. 1, and comprise a CPU 21, a ROM 22, a RAM 23 and a LNA 24. In addition, they comprise a FDC 25 controlling a FDD 26. An example of a device used for the CPU 11, 21, is Microprocessor 8088 supplied by Intel Corporation, U.S.A. An example of a device used for the LNA 14, 24 is μPD 2701 supplied by Nippon Electric Co., Ltd., Japan. An example of a device used for the FDC 15, 25 is μPD 765 supplied by Nippon Electric Co., Ltd., Japan.

Figure 3:
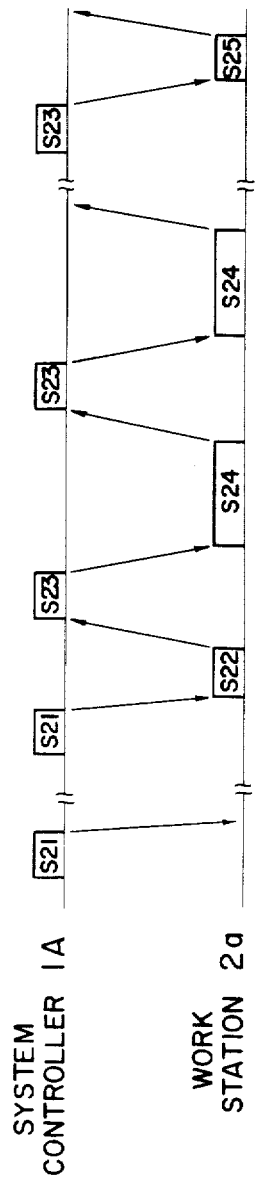
FIGS. 3 and 4 are time charts illustrating the operation of the system shown in FIG. 2.

Operation for initial program loading on the system controller 1A in the above described system will now be described with reference to FIG. 3. When the system controller 1A is powered, the CPU 11 starts its operation and executes the program in the ROM 12 to carry out the following operations. First, the LNA 14 is started and enquiry is made to each of the work stations 2a, 2b, as to whether or not the work station is powered (step S21). When none of the work stations are powered, no answer is returned to the system controller 1A, and the system controller 1A repeats the inquiry (step 21).

When any of the work stations, say the work station 2a, is powered, it enters in a state where the CPU 21 starts its operation and executes the program in the ROM 22. In this state, the CPU 21 of the work station 2a starts, in response to the enquiry (step S21) from the system controller 1A, the LNA 24 and sends back to the system controller 1A a status signal indicating that it is now powered (step S22). The system controller 1A knows from the status signal that a data link is established between the system controller 1A and the work station 2a. The CPU 11 of the system controller 1A then sends to the work station 2a a request for initial program data transfer (IPDT) (step S23). When the CPU 21 of the work station 2a receives through the LNA 24 the IPDT request it reads the program data (i.e., part of the program) in a floppy disk on the. FDD 26 under the control of the FDC 25 and stores it in the RAM 23. The CPU 21 then forms an information frame suitable for the transfer incorporating the program data in the RAM 23, and sends the information frame through the LNA 24, and the connecting cable 3 to the system controller 1A (step S24). The CPU 11 of the system controller 1A reads and decodes the information frame through the LNA 14 and writes the program data at the appropriate location in the RAM 13. The above described steps S23, S24 are repeated until transfer of all the program data is completed. Upon completion of the transfer, the work station 2a sends a completion status signal to the system controller 1A (step S25), and notifies that the entire program has been transferred. When the CPU 11 of the system controller 1A receives the notification, it transfers the control from the execution of the program in the ROM 12 to the execution of the program just loaded in RAM 13, and starts execution of the system program.

Initial program loading onto each work station 2 can be made by transferring the program directly from the FDD 26 connected thereto.

In this way, initial program loading onto the system controller 1A can be accomplished without having an input/output device such as a FDD connected to the system controller 1A, but by transferring the program from one of the work stations through the connecting cable 3.

A second embodiment of the invention is now described. The second embodiment is for transferring a program from one of the work stations, e.g. 2a to another work station, e.g., 2b, after initial program loading is completed with respect to the system controller 1A and the work station 2a (which is performing its task by executing the control program).

The initial program loading on the system controller 1A and the work station 2a can be done in any manner. For example, it can be done from an external memory (not shown) of the system controller 1A or an external memory, such as a FDD connected to the work station 2a. If, however, the initial program loading is effected by transfer from the external memory connected to the work station as is in the first described embodiment, it is advantageous since the external memory of the system controller 1A can be eliminated.

When the work station 2b is powered, the initializing program in the ROM 22 of the work station 2b is started. The operations performed thereafter are described with reference to the time chart of FIG. 4.

The work station 2b just powered issues a request for initial program loading (IPL) through the connecting line 3 (step S31). The system controller 1A which has received the IPL request 1A searches for a work station on which initial program loading is already completed (step S32). It is assumed that the work station 2a has the initial program loading completed. When such a work station as has the initial program loading completed is found, the system controller 1A sends a request for initial program data transfer (IPDT) to the work station 2a. When the work station 2a, receives the IPDT request it reads the program (part at a time), and adds address information to form an information frame, and sends it to the system controller 1A (step S33). The system controller 1A transfers the information frame to the work station 2b which has issued the IPL request. The initializing program of the work station 2b decodes the information frame and stores the program in the appropriate location in the RAM 23.

The above-described operations in the steps S32, S33, S34 are repeated until the entire program is transferred to the work station 2b.

When the transfer of the program is completed, the work station 2a transmits a completion status signal to the system controller 1A (step S35). The system controller 1A notifies the IPL completion to the work station 2b (step S36).

The work station 2b, when being notified of the IPL completion, transfers from the initializing program to the control program (which has just been transferred) and starts the execution of the control program.

The work station 2a, which has the initial loading of the control program completed, starts executing the control program to perform the task.

Figure 5:
FIG. 5 is a diagram showing an information frame used where the HDLC procedure is employed for the data transfer.

FIG. 5 illustrates an example of the information frame used when the HDLC (high level data link control) procedure is used as the data transmission procedure in the above described embodiments. As illustrated, the information frame comprises a flag F, a work station address A, a control field C (indicating which of the various kinds of the data is transmitted, the control program being one particular kind of such data), length LEN of the information, an address ADDR, in 3 bytes, at which the program information is stored, program information I and field check sequence FCS. The makeup of the information is not limited to the above example, and can be varied or modified.

Figure 4:
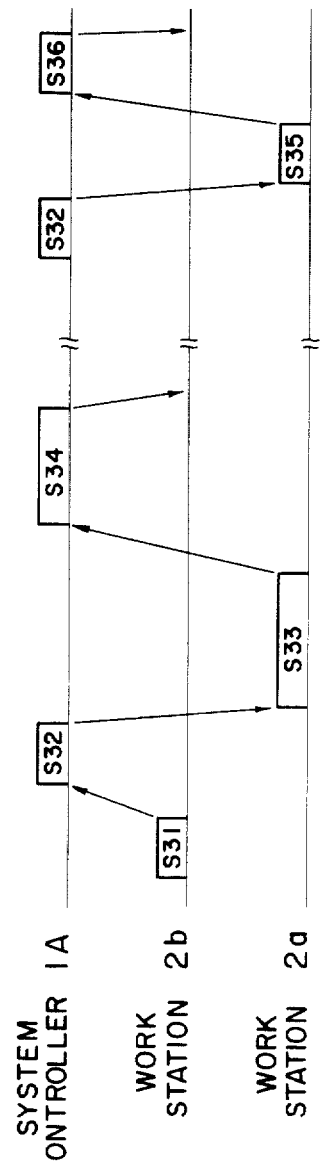

In the operations described with reference to the time charts of FIGS. 3 and 4, polling, selecting, etc. are required while following the HDLC procedure, but their details are omitted for brevity of the description.

In the above-described second embodiment, the transmission of information from the work station 2a to the work station 2b is made via the system controller 1A. This is because the HDLC procedure is followed. But the invention is not limited to such method and the transmission to the work station 2b can be made directly from the work station 2a.

In the above described embodiments, the programs in the ROM 12, 22 are used to effect the initial program loading. Arrangement may alternatively be such that the programs in the ROM 12, 22 have the function of what is generally termed as "boot loading", i.e., function of loading in RAM the programs effecting the initial program loading, in which case, upon completion of the loading of the programs in RAM, the control is transferred from the ROM to the RAM to effect the initial program loading. With this arrangement, the capacity of the ROM 12, 22 can be reduced.

In the above described embodiments, a FDD is used as the input/output device, but the invention is not limited to the use of a FDD and a magnetic disk, magnetic tape, punched tape, and punched cards are similarly used.

As has been described, the invention eliminates the need for an input device of the system controller, thereby improving the efficiency in terms of cost and space.

In addition, the initial program loading on a work station is accomplished by transmitting the program from another work station which is already in operation, so that it is not necessary to occupy an area in the memory within the system controller or in the external memory for storing the program of the work stations. As a result, it is possible either to utilize the memory area for execution of the task of the system controller or to reduce the size of the memory.

The second embodiment of the invention is applicable where the same program is shared by a plurality of work stations. It is not necessary that all the work stations have the same hardware structure but they may differ provided that the use of the same program is enabled by software processing, by program initializing processing etc. at the time of program execution commencement.

What is claimed is:

1. A decentralized information processing system comprising a plurality of work stations connected to a common data transmission path, and a system controller controlling flow of data being transmitted through the common data transmission path within said system, wherein said system controller comprises:
(a) first memory means for storing a system controller program for controlling operations of the system controller;
(b) second memory means for storing a loading program for looading the system controller program into said first memory means upon power-up of said system;
(c) first transmission control means for establishing a transmission link along said transmission path with at least one of said plurality of work stations and for loading information transmitted from the work stations in said first memory means; and
(d) processing means for executing the loading program stored in said second memory means to perform the loading of the system controller program, said processing means executing the system controller program loaded in the first memory means so that the system controller controls flow of data within said system, each of the work stations comprises:
(e) second transmission control means cooperating with said first transmission control means for establishing a transmission link along said transmission path with the system controller and for transferring information to the system controller to load said system controller program in the first memory means of the system controller; and
(f) memory means for storing said system controller program to be loaded in the first memory means of the system controller, and said processing means of said system controller executing said loading program upon power-up of said system for selecting at least one work station which is powered-up, and cooperating with said first transmission control means and said second transmission control means of said selected work station for transferring said system controller program stored in said memory means of said selected work station to said first memory means of said system controlled along said transmission path.

2. A system according to claim 1, wherein each of said work stations is provided with an external memory device, storing said system controller program and means for transferring information from said external memory device to said memory means of said work station and, at the time of the power of the system controller and said selected work station, said information transferring means of said selected work station transfers said system controller program from said external memory device into the memory means of the selected work station.

3. A system according to claim 1, wherein said first memory means comprises random access memory and said second memory means comprise a read only memory.

4. A decentralized information processing system comprising a plurality of work stations connected to a common data transmission path and a system controller controlling flow of data being transmitted through the common data transmission path within said system, wherein each of said work stations comprises:
(a) memory means for storing an initial program for controlling initial operations of the work station;
(b) transmission control means for establishing a transmission link for exchanging data with said system controller and with other work stations; and
(c) means for transmitting along said transmission link a first signal for requesting a loading of said initial program to the system controller, said transmitting means transmitting said first signal to said system controller at the time of power-up of each work station;

said memory means of at least one of said work stations storing said initial program having been loaded therein;

said system controller comprising:
(d) transmission control means cooperating with said transmission control means of each work station for establishing said transmission link;
(e) processing means, responsive to said first signal from another said work stations for selecting said one work station having said initial program already loaded in the memory means thereof;
(f) said processing means transmitting to said selected one work station through said transmission link established therebetween a second signal for requesting transfer of said initial program stored in said selected one work station; and said selected one work station received said second signal and, in response thereto, transmitting said initial program stored therein to said another work station.

5. A system according to claim 4, wherein said selected one work station transfers said initial program to said system controller, said system controller receiving said initial program and transmitting same to said other work station.

6. In a decentralized information processing system having a plurality of work stations connected along a data transmission path and a system controller for controlling flow of data being transmitted through the common data transmission path within said system, said system controller having memory means for storing a system controller program for controlling operations of the system controller and at least one of said work stations having memory means initially storing the system controller program, a method of loading the system controller program into said system controller comprising the steps of:
  (a) upon power-up of said system, establishing a data link between said system controller and at least one of said work stations;
  (b) transmitting said system controller program from said memory means of said at least one work station to said memory means of said system controller along said established data link; and
  (c) executing said system controller program said system controller so that the system controller performs operations defined by the system controller program.

7. In a decentralized information processing system having a plurality of work stations connected along a data transmission path and a system controller controlling flow of data being transmitted through the common data transmission path within said system,
  a method of loading an initial program for controlling initial operations of each of said work station in one of said work stations requesting same, comprising the steps of:
  (a) establishing a data link between said one work station and said system controller;
  (b) transmitting to said system controller a first signal for requesting search for another work station storing said initial program;
  (c) searching for said another work station by said system controller in response to said first signal;
  (d) transmitting said initial program stored in said another work station to said one work station;
  (e) storing said initial program in said one work station; and
  (f) executing said initial program in said one work station by data processing means within said one work station so that the one work station performs said initial operations.

8. A method as recited in claim 7, wherein the step of transmitting said initial program stored in said another work station to said one work station includes the steps of:
  transmitting said initial program along a data link between said another work station and said system controller; and
  transmitting said initial program along a data link between said system controller and said one work station.

9. A method as recited in claim 7, wherein the step of transmitting said initial program stored in said another work station to said one work station includes the steps of:
  establishing another data link between said system controller and said another work station; and
  transmitting by said system controller a second signal for requesting to said another work station a loading of said initial program stored in said another work station into said one work station.

* * * * *